United States Patent
Chong, Jr.

(10) Patent No.: US 6,604,155 B1
(45) Date of Patent: Aug. 5, 2003

(54) STORAGE ARCHITECTURE EMPLOYING A TRANSFER NODE TO ACHIEVE SCALABLE PERFORMANCE

(75) Inventor: Fay Chong, Jr., Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/437,085

(22) Filed: Nov. 9, 1999

(51) Int. Cl.$^7$ ................................. G06F 13/14
(52) U.S. Cl. ................. 710/56; 710/105; 710/126; 709/231
(58) Field of Search ................. 710/126, 105, 710/56; 709/231

(56) References Cited

U.S. PATENT DOCUMENTS

| | | |
|---|---|---|
| 4,151,593 A | 4/1979 | Jenkins et al. |
| 4,603,416 A | 7/1986 | Servel et al. |
| 5,113,500 A | 5/1992 | Talbott et al. |
| 5,148,432 A | 9/1992 | Gordon et al. |
| 5,206,943 A | 4/1993 | Callison et al. |
| 5,448,709 A | 9/1995 | Chandler et al. |
| 5,487,160 A | 1/1996 | Bemis |
| 5,526,497 A | 6/1996 | Zilka et al. |
| 5,664,145 A | 9/1997 | Apperley et al. |
| 5,668,956 A | 9/1997 | Okazawa et al. |
| 5,720,028 A | 2/1998 | Matsumoto et al. |
| 5,724,539 A | 3/1998 | Riggle et al. |
| 5,793,763 A | 8/1998 | Mayes et al. |
| 5,805,821 A * | 9/1998 | Saxena et al. ............... 709/213 |
| 5,819,054 A * | 10/1998 | Ninomiya et al. ............. 712/3 |
| 5,867,733 A | 2/1999 | Meyer |
| 5,870,521 A | 2/1999 | Shinoda |
| 5,896,492 A | 4/1999 | Chong, Jr. |
| 5,913,057 A | 6/1999 | Labatte et al. |
| 6,023,754 A | 2/2000 | DuLac et al. |
| 6,065,096 A | 5/2000 | Day et al. |
| 6,085,285 A | 7/2000 | Lucas et al. |
| 6,101,565 A | 8/2000 | Nishtala et al. |
| 6,115,394 A | 9/2000 | Balachandran et al. |
| 6,134,627 A | 10/2000 | Bak |
| 6,161,208 A | 12/2000 | Dutton et al. |
| 6,167,424 A | 12/2000 | Bak et al. |
| 6,389,494 B1 * | 5/2002 | Walton et al. ............... 710/317 |
| 6,397,267 B1 | 5/2002 | Chong, Jr. |

OTHER PUBLICATIONS 10 pgs. of information re: RAID Technology, © 1997, 1998 by Advanced Computer & Network Corp.
Meggyesi, "Fibre Channel Overview," Aug. 1994, 9 pgs.

* cited by examiner

Primary Examiner—Jeffrey Gaffin
Assistant Examiner—Abdelmoniem Elamin
(74) Attorney, Agent, or Firm—Robert C. Kowert; Meyertons, Hood, Kivlin, Kowert & Goetzel, P.C.

(57) ABSTRACT

One embodiment of a transfer node is described, including a first channel port adapted for coupling to a host computer, a second channel port adapted for coupling to a storage controller and one or more storage devices, a central processing unit (CPU) coupled to the first and second channel ports, and a memory coupled to the CPU. The transfer node receives data routing information associated with a data transfer command from the storage controller via the second channel port, wherein the data transfer command directs a transfer of data between the host computer and the one or more storage devices. The transfer node stores the data routing information within the memory, and routes data associated with the data transfer command between the first and second channel ports using the data routing information stored within the memory. As a result, the data associated with the data transfer command is routed between the host computer and the one or more storage devices such that the data does not pass through the storage controller, allowing independent scalability of a number of input/output operations per second (IOPS) and a data transfer rate of a storage system including the transfer node. Several embodiments of a computer system are described, wherein each embodiment of the computer system has a storage system including the transfer node coupled in series with a switch between the host computer and the one or more storage devices.

25 Claims, 12 Drawing Sheets

STORAGE ARCHITECTURE EMPLOYING A TRANSFER NODE TO ACHIEVE SCALABLE PERFORMANCE

BACKGROUND OF THE INVENTION

1. Field of the Invention

This invention relates to data storage systems, and more particularly to data storage systems having a storage device controller interposed between a host computer and one or more data storage devices wherein the controller manages the storage of data within the one or more storage devices.

2. Description of the Related Art

Auxiliary storage devices such as magnetic or optical disk arrays are usually preferred for high-volume data storage. Many modern computer applications, such as high resolution video or graphic displays involving on-demand video servers, may heavily depend on the capacity of the host computer to perform in a data-intensive environment. In other words, necessity for external storage of data in relatively slower auxiliary data storage devices demands that the host computer system accomplish requisite data transfers at a rate that does not severely restrict the utility of the application that necessitated high-volume data transfers. Due to the speed differential between a host processor and an external storage device, a storage controller is almost invariably employed to manage data transfers to/from the host and from/to the storage device.

The purpose of a storage controller is to manage the storage for the host processor, leaving the higher speed host processor to perform other tasks during the time the storage controller accomplishes the requested data transfer to/from the external storage. The host generally performs simple data operations such as data reads and data writes. It is the duty of the storage controller to manage storage redundancy, hardware failure recovery, and volume organization for the data in the auxiliary storage. Redundant array of independent disks (RAID) algorithms are often used to manage data storage among a number of disk drives.

FIG. 1 is a diagram of a conventional computer system 10 including a host computer 12 coupled to a storage controller 14 by an interconnect link 16, and two storage devices 18A–18B coupled to storage controller 14 by respective interconnect links 20A and 20B. Each storage device 18 may be, for example, a disk drive array or a tape drive. Links 16 and 20A–20B may include suitable interfaces for I/O data transfers (e.g., Fibre Channel, small computer system interface or SCSI, etc.) As evident in FIG. 1, all of the information involved in data transfers between host computer 12 and storage devices 18A–18B passes through storage controller 14. Storage controller 14 receives command, status, and data packets during the data transfer.

FIG. 2 is a diagram illustrating an exemplary flow of control and data packets during a data read operation initiated by host computer 12 of FIG. 1. Links 16 and 20A–20B in FIG. 1 may be Fibre Channel links, and the data transfer protocol of FIGS. 1 and 2 may be the Fibre Channel protocol. Referring to FIGS. 1 and 2 together, host computer 12 issues a read command packet identifying storage controller 14 as its destination (XID=H,A) via link 16. Storage controller 14 receives the read command and determines that two separate read operations are required to obtain the requested data; one from storage device 18A and the other from storage device 18B.

Storage controller 14 translates the read command from host computer 12 into two separate read commands, one read command for storage device 18A and the other read command for storage device 18B. Storage controller 14 transmits a first read command packet identifying storage device 18A as its destination (XID=A,B) via link 20A, and a second read command packet identifying storage device 18B as its destination (XID=A,C) via link 20B. Each read command packet instructs respective storage devices 18A–18B to access and provide data identified by the read command. Storage device 18A (ID=B) accesses the requested data and transmits a data packet followed by a status packet (XID=B,A) to storage controller 14 via link 20A. Storage device 18B (ID=C) accesses the requested data and transmits a data packet followed by a status packet (XID=C,A) to storage controller 14 via link 20B. Each status packet may indicate whether the corresponding read operation was successful (i.e. whether the data read was valid).

Storage controller 14 typically includes a memory unit, and temporarily stores data and status packets in the memory unit. Storage controller 14 then consolidates the data received from storage devices 18A–18B and processes the status packets received from storage devices 18A–18B to form a composite status. Storage controller 14 transmits the consolidated data followed by the composite status (XID=A,H) to host computer 12 via link 16, completing the read operation. In the event that the composite status indicates a read operation error, host computer 12 may ignore the consolidated data and initiate a new read operation. In general, the flow of packets depicted in FIG. 2 is typical of a two-party point-to-point interface protocol (e.g., the Fibre Channel protocol).

As indicated in FIG. 1, storage controller 14 includes multiple communication ports. In addition to the memory and the multiple communication ports, storage controller 14 also typically includes one or more central processing units (CPUs). The multiple communication ports and the CPUs may be coupled to a communication bus. The CPUs and the memory may be coupled to a common bus within storage controller 14, and the CPUs may access the memory via the bus.

Two parameters are commonly used to measure the performance of a storage system: (1) the number of input/output (I/O) operations per second (IOPS), and (2) the data transfer rate of the storage system. Generally, the rate of execution of I/O operations by a storage controller is governed by the type, speed and number of CPUs within the storage controller. The data transfer rate depends on the data transfer bandwidth of the storage controller. In computer system 10 described above, all of the data transferred between host computer 12 and storage devices 18A–18B is temporarily stored within the memory of storage controller 14, and thus travels through the bus of storage controller 14. As a result, the data transfer bandwidth of storage controller 14 is largely dependent upon the bandwidth of the bus of storage controller 14.

Current storage systems have restricted scalability because of the storage controllers having a relatively inflexible ratio of CPU to bandwidth capability. This is especially true if they are based on "off-the-shelf" microprocessors or computer systems. Usually the storage controller is designed to satisfy the majority of IOPS and data rate performance requirements with one implementation. This interdependence between IOPS and data transfer rate results in less efficient scalability of performance parameters. For example, in conventional storage controller architectures, an increase in data transfer rate may require both an increase in data transfer bandwidth and an increase in the number of CPUs residing within the controller.

It would thus be desirable to have a storage system wherein control functionality (as measured by the IOPS parameter) is scalable independently of the data transfer bandwidth (which determines the data transfer rate), and vice versa. It may be further desirable to achieve independence in scalability without necessitating a change in the existing communication protocol used within the storage system.

SUMMARY OF THE INVENTION

One embodiment of a transfer node is described, including a first channel port adapted for coupling to a host computer, a second channel port adapted for coupling to a storage controller and one or more storage devices, a central processing unit (CPU) coupled to the first and second channel ports, and a memory coupled to the CPU. The transfer node receives data routing information associated with a data transfer command from the storage controller via the second channel port, wherein the data transfer command directs a transfer of data between the host computer and the one or more storage devices. The transfer node stores the data routing information within the memory, and routes data associated with the data transfer command between the first and second channel ports using the data routing information stored within the memory. For example, when the data transfer command is a read command, the transfer node receives data associated with the data transfer command from the one or more storage devices via the second channel port, routes the data from the second channel port to the first channel port using the data routing information stored within the memory, and forwards the data to the host computer via the first channel port. As a result, the data associated with the data transfer command is routed between the host computer and the one or more storage devices such that the data does not pass through the storage controller, allowing independent scalability of a number of input/output operations per second (IOPS) and a data transfer rate of a storage system including the transfer node. Several embodiments of a computer system are described, wherein each embodiment of the computer system has a storage system including the transfer node coupled in series with a switch between the host computer and the one or more storage devices.

In one embodiment, the memory of the transfer node includes a first lookup table and a data buffer area, and the data routing information includes command identification information uniquely identifying the data transfer command and one or more pointers to data buffers within the data buffer area. The command identification information and the pointers are stored within the first lookup table. The transfer node is configured to store the data associated with the data transfer command within the data buffers using the pointers. When the data transfer command is a read command, the data is received from the one or more storage devices at the second channel port, and the transfer node routes the data from the data buffers to the first channel port when all of the data associated with the data transfer command has been received by the transfer node. On the other hand, when the data transfer command is a write command, the data is received from the host computer at the first channel port, and the transfer node routes the data from the data buffers to the second channel port when all of the data associated with the data transfer command has been received by the transfer node.

In a second embodiment, the memory includes a second lookup table, and the data routing information includes target header information and corresponding substitute header information. The target header information includes at least a portion of a header field of an expected data frame, and the substitute header information includes header information to be substituted for the header information of the expected data frame. The target header information and corresponding substitute header information are stored within the second lookup table. The transfer node is configured to: (i) compare header information of a data frame received at either the first channel port or the second channel port to the target header information within the second lookup table, (ii) replace the header information of the data frame with the substitute header information corresponding to the target header information if the header information of the data frame matches the target header information, and (iii) route the data frame to the other channel port.

For example, when the data transfer command is a read command, the transfer node compares header information of a data frame received at the second channel port to the target header information within the second lookup table, replaces the header information of the data frame with the substitute header information corresponding to the target header information if the header information of the data frame matches the target header information, and routes the data frame to the first channel port.

In a preferred embodiment, the transfer node also receives the data transfer command from the host computer via the first channel port and forwards the data transfer command to the storage controller via the second channel port. In the preferred embodiment, the transfer node also receives a translated data transfer command from the storage controller via the second channel port and forwards the translated data transfer command to the one or more storage devices via the second channel port.

Several embodiments of a computer system are described, wherein each embodiment of the computer system has a storage system including a switch coupled to one or more storage devices, the above described transfer node coupled between a host computer and the switch, and a storage controller coupled to the transfer node. The storage controller may be coupled to the switch, or coupled directly to the transfer node. The transfer node receives a data transfer command from the host computer and forwards the data transfer command to the storage controller. The storage controller receives the data transfer command, generates a translated data transfer command and data routing information in response to the data transfer command, and forwards the translated data transfer command and the data routing information to the transfer node. The transfer node forwards the translated data transfer command to the one or more storage devices, stores the data routing information within the memory, and uses the data routing information to route data associated with the data transfer command between the host computer and the one or more storage devices such that the data does not pass through the storage controller. As a result, the storage controller is removed from a data path between the host computer and the one or more storage devices, allowing independent scalability of the IOPS and data transfer rate of the storage system.

One method for routing data within a storage system includes coupling a transfer node between a host computer and a switch, wherein the switch is coupled to one or more storage devices, and wherein the transfer node includes a memory for storing data routing information. A storage controller is coupled to the transfer node. Data routing information associated with a data transfer command is forwarded from the storage controller to the transfer node. The data routing information is stored within the memory of the transfer node, and used to route data associated with the data transfer command between the host computer and the one or more storage devices such that the data does not pass through the storage controller.

A second method for conveying data within storage system having a storage controller and a transfer node includes the transfer node receiving a data transfer command from a host computer coupled to the transfer node. The transfer node conveys the data transfer command to the storage controller. The storage controller generates data routing information dependent upon the data transfer command, and conveys the data routing information to the transfer node. The transfer node receives data for the data transfer command from one or more storage devices, and forwards the data to the host computer so that the data is conveyed from the one or more storage devices to the host computer without being conveyed through the storage controller.

A third method for conveying data within the storage system described above includes the transfer node receiving a data transfer command from a host computer coupled to the transfer node. The transfer node conveys the data transfer command to the storage controller. The storage controller translates the data transfer command into one or more device data transfer commands, and conveys the device data transfer commands to the transfer node on the controller bus. The transfer node forwards the device data transfer commands to one or more storage devices. The transfer node receives data in response to the device data transfer commands and forwards the data to the host computer so that the data is conveyed from the one or more storage devices to the host computer without being conveyed through the storage controller.

BRIEF DESCRIPTION OF THE DRAWINGS

Other objects and advantages of the invention will become apparent upon reading the following detailed description and upon reference to the accompanying drawings in which.

Figure 1:
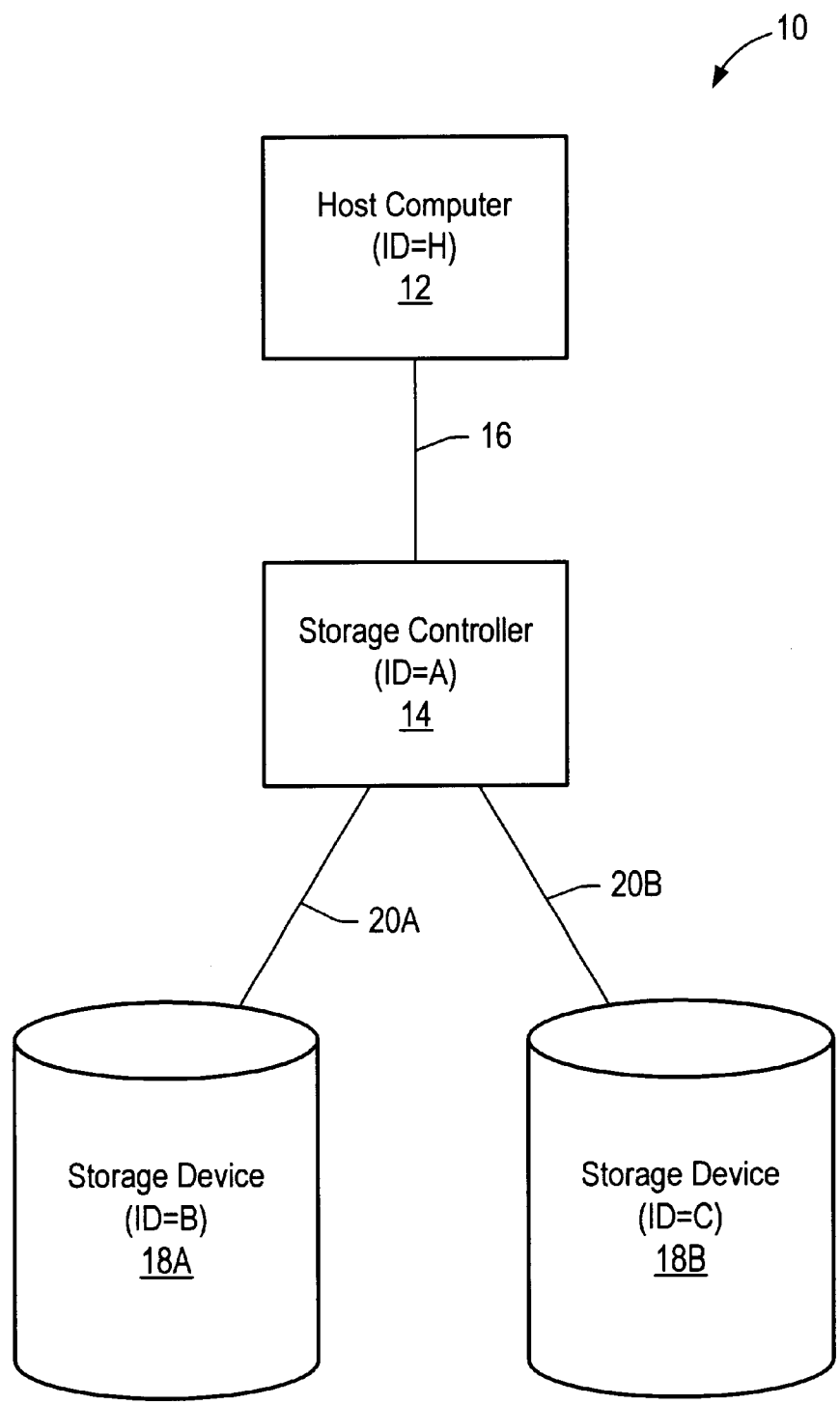
FIG. 1 is a diagram of a conventional computer system including a host computer coupled to a storage controller and two storage devices coupled to the storage controller.
Figure 2:
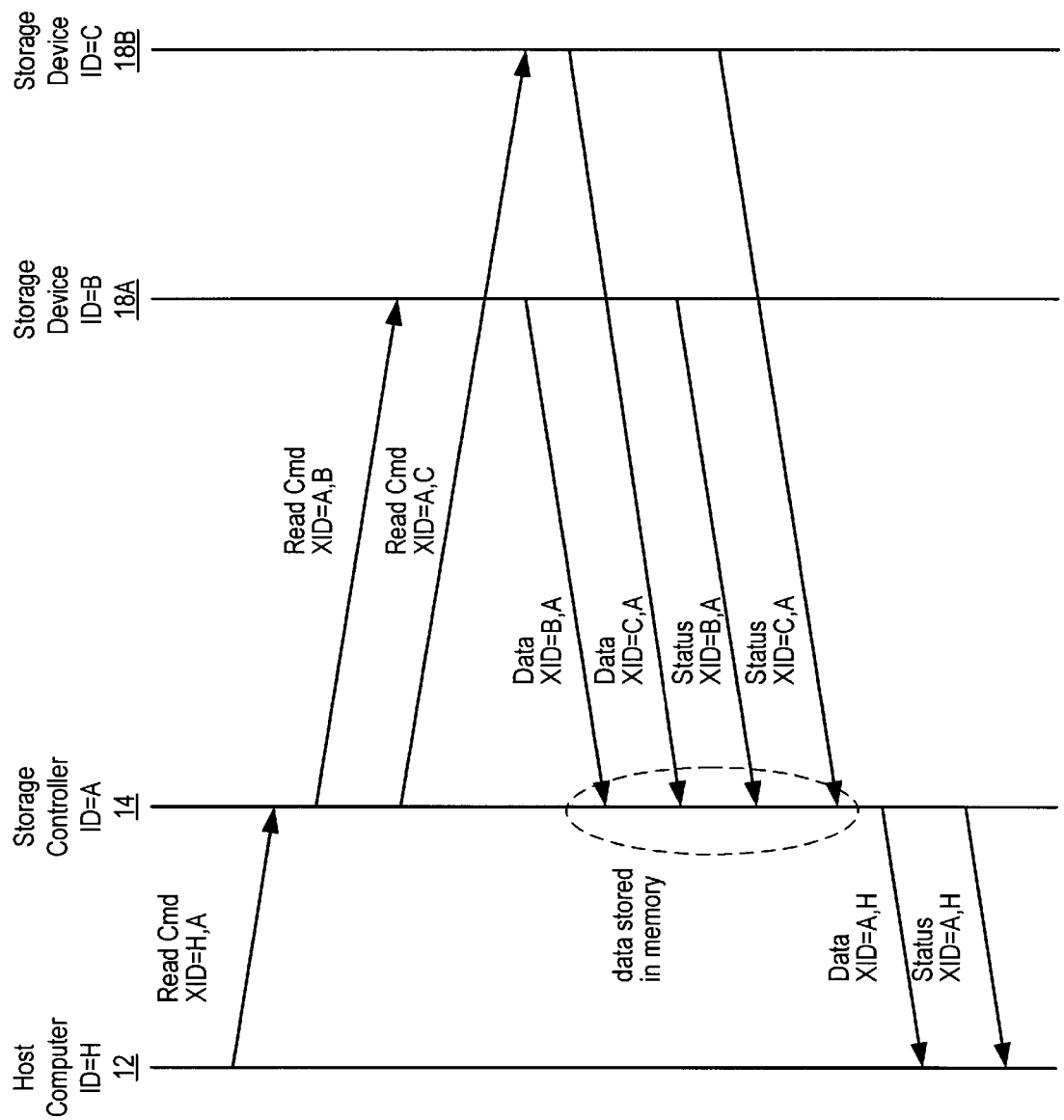
FIG. 2 is a diagram illustrating an exemplary flow of control and data packets during a data read operation initiated by the host computer of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3A:
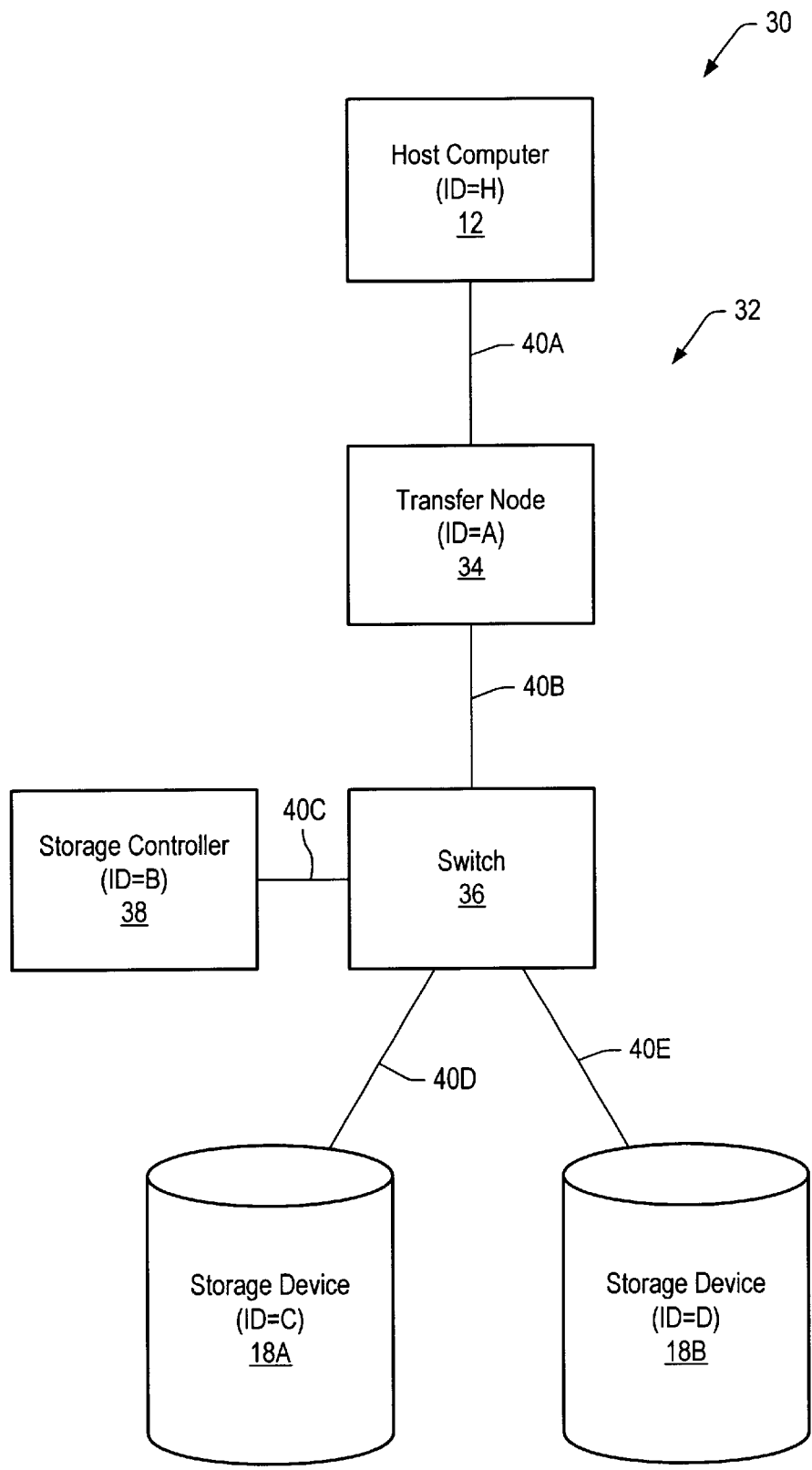
FIG. 3A is a diagram of a first embodiment of a computer system including the host computer coupled to a storage system, wherein the storage system includes a transfer node, a switch, a storage controller, and the two storage devices.

FIG. 3A is a diagram of a first embodiment of a computer system 30 including host computer 12 coupled to a storage system 32. Storage system 32 includes a transfer node 34, a switch 36, a storage controller 38, and storage devices 18A–18B. Host computer 12 is coupled to transfer node 34 via an interconnect link 40A. Transfer node 34 is coupled to switch 36 via an interconnect link 40B. Storage controller 38 is coupled to switch 36 via an interconnect link 40C. Storage devices 18A–18B are coupled to switch 36 via respective interconnect links 40D and 40E. Interconnect links 40A–40E include at least one transmission medium, and preferably include a pair of unidirectional transmission media, each of the pair of transmission media providing communication in a direction opposite the other. Switch 36 is a conventional switch, and merely routes received packets within storage system 32. Switch 36 does not have an address, and communication packets are not addressed to switch 36.

Figure 3B:
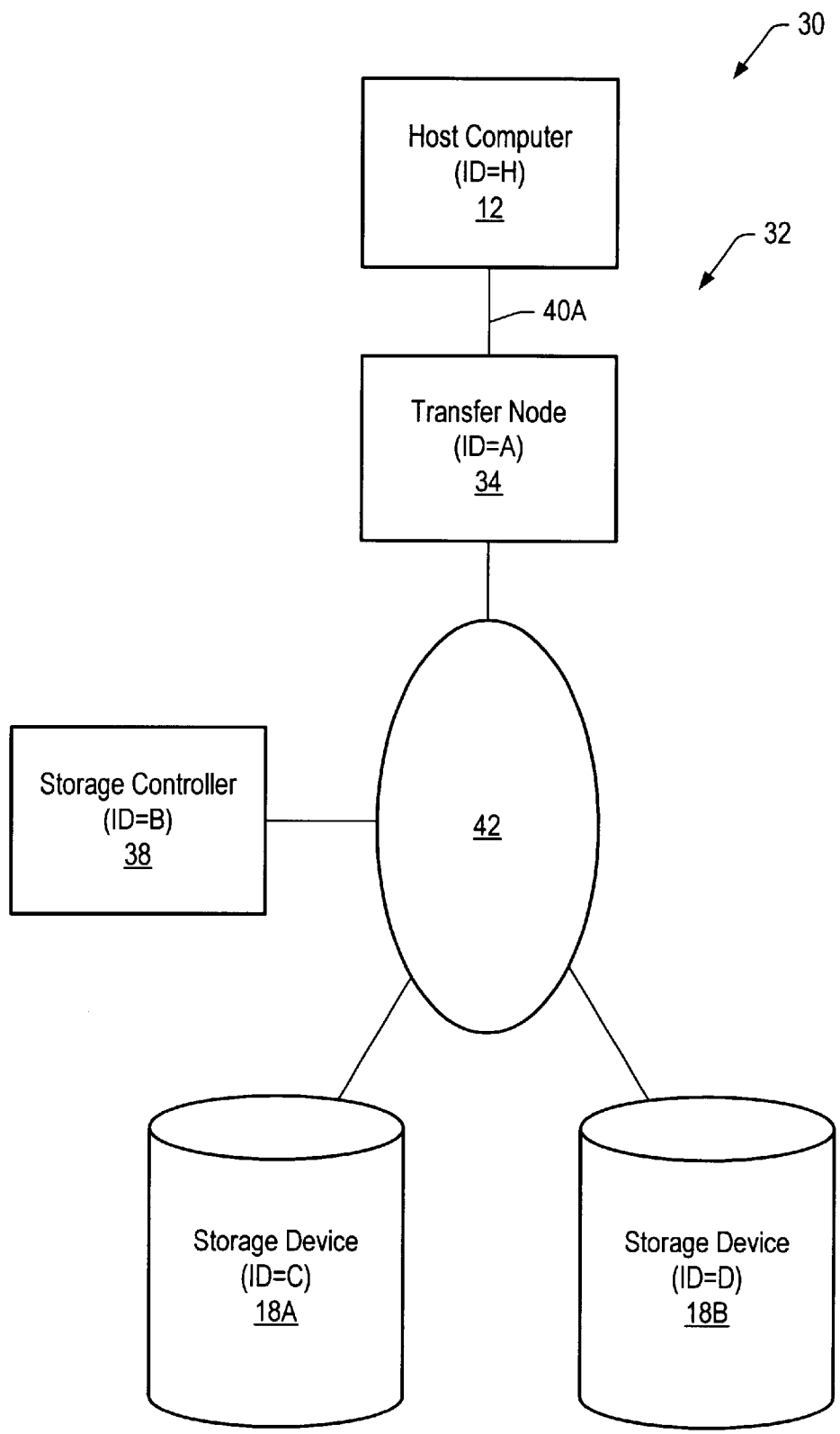
FIG. 3B is a diagram of a second embodiment of the computer system of FIG. 3A wherein the transfer node, the storage controller, and the two storage devices are coupled to a transmission medium configured as a loop (e.g., a Fibre Channel arbitrated loop)

FIG. 3B is a diagram of a second embodiment of computer system 30. In the embodiment of FIG. 3B, transfer node 34, storage controller 38, and storage devices 18A–18B are all coupled to a transmission medium configured as a loop 42 (e.g., a Fibre Channel arbitrated loop). Transfer node 34, storage controller 38, and storage devices 18A–18B communicate via loop 42. It is noted that communications via loop 42 do not violate a two party protocol such as the Fibre Channel protocol.

As will be described in more detail below, transfer node 34 eliminates storage controller 38, and link 40C in the embodiment of FIG. 3A, from a data path between host computer 12 and storage devices 18A–18B, thus allowing independent scalability of a number of input/output operations per second (IOPS) and a data transfer rate of storage system 32.

Physical interconnect and signaling methods employed within computer system 30 preferably comply with the Fibre Channel standard. Alternately, any physical interconnect and signaling methods may be employed, including small computer system interface (SCSI) methods, asynchronous transfer mode (ATM) methods, and transmission control protocol/internet protocol (TCP/IP) methods.

Each storage device 18 includes one or more storage devices, and preferably includes multiple storage disks organized as a disk array (e.g., a redundant array of independent disks or RAID). Each storage device 18 may be, for example, a storage subsystem with multiple disk drives and a resident RAID controller. There are currently several different RAID levels each offering different degrees of performance and fault tolerance. For example, RAID level 0 spreads out blocks of data across multiple disks (i.e., provides data striping). However, RAID level 0 provides no data redundancy. RAID level 0 offers relatively high performance, but no fault tolerance. RAID level 1 provides disk mirroring and 100 percent data redundancy. It is noted that a combination of RAID levels (e.g., RAID levels 0 and 1) may also be implemented. Each storage device 18 may also include other types of discrete physical devices using magnetic or other types of storage media (e.g., CD ROM drives, magnetic tape drives, optical video disk drives, etc.).

In one embodiment, storage controller 38 implements one or more RAID algorithms to manage data storage and/or data recovery operations. In an alternative embodiment, each storage device 18 includes a resident RAID controller, and storage controller 38 simply issues data transfer commands to storage devices 18A–18B without specifying RAID levels for data storage.

Storage controller 38 receives a data transfer command (i.e., a data read or write command) from host computer 12 via a control path including transfer node 34, switch 36, and links 40A–40C. Storage controller 38 translates the data transfer command dependent upon: (i) the data transfer command, and (ii) configuration information of storage devices 18A–18B (e.g., a RAID configuration of storage devices 18A–18B). Storage controller 38 thereby produces one or more translated data transfer commands each directed to a storage device 18. Storage controller 38 forwards the one or more translated data transfer commands to transfer node 34. Transfer node 34 forwards the translated data transfer commands to storage device 18A and/or storage device 18B as appropriate.

The one or more translated data transfer commands may also include appropriate commands for the RAID configuration of storage devices 18A–18B. For example, a group of RAID levels including RAID levels 1 and 5 may have been identified when a given storage volume was established within storage system 32. During translation of a write command received from host computer 12, storage controller 38 may dynamically select one or more RAID levels from the group dependent upon on, for example, the type of write command and/or prior storage history for that type of write command. Storage controller 38 may determine, for example, that one data block is to be stored within storage device 18A and/or storage device 18B according to RAID level 1, whereas another data bock is to be stored according to RAID level 5.

Storage controller 38 also produces data routing information for the data transferred between host computer 12 and storage device 18A and/or storage device 18B dependent upon: (i) the data transfer command, and (ii) the configuration information of storage devices 18A–18B (e.g., a RAID configuration of storage devices 18A–18B). Storage controller 38 forwards the data routing information to transfer node 34 along with the translated data transfer commands.

Figure 4:
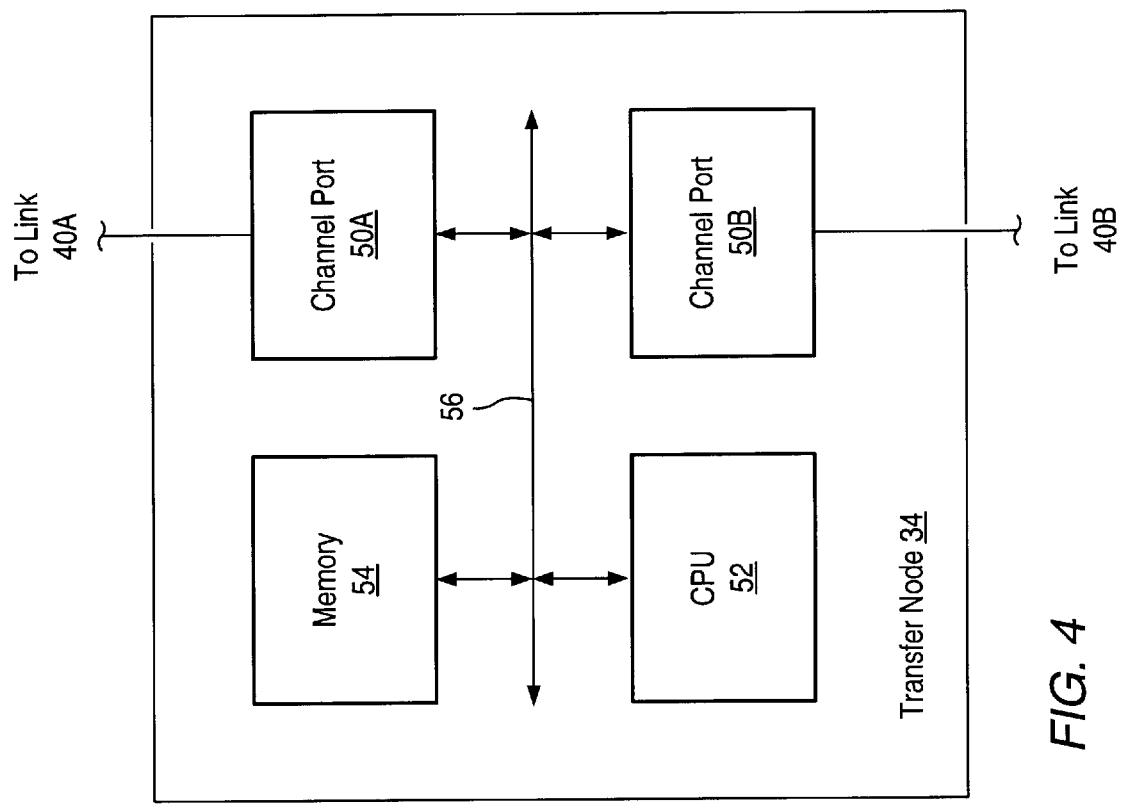
FIG. 4 is a block diagram of one embodiment of the transfer node of FIGS. 3A–3B, wherein the transfer node includes a memory.

FIG. 4 is a block diagram of one embodiment of transfer node 34 of FIGS. 3A–3B. In the embodiment of FIG. 4, transfer node 34 includes two channel ports 50A–50B, a central processing unit (CPU) 52, and a memory 54 coupled to a node bus 56. Channel port 50A is coupled to link 40A, and channel port 50B is coupled to link 40B. Channel ports 50A–50B receive and transmit packets, including control and data packets. As will be described below, transfer node 34 separates data and control paths within storage system 32.

When channel port 50B receives data routing information, associated with a data transfer command, from storage controller 38, CPU 54 stores the data routing information within memory 54. CPU 54 uses the data routing information to route data associated with the data transfer command between host computer 12 and storage device 18A and/or storage device 18B such that storage controller 38 and link 40C are eliminated from the data path. As a result, the IOPS and data transfer rate of storage system 32 are independently scalable. For example, the rate at which input/output operations are executed within storage system 32 may be increased by increasing the computation capability of storage controller 38 (e.g., by increasing a number of CPUs within storage controller 38). The data transfer rate of storage system 32 may be increased by increasing the rates at which data is conveyed upon (i.e., bandwidths of) links 40A–40E and/or the number of links 40 (FIG. 3A), or by increasing the bandwidth of loop 42 and/or the number of loops 42 (FIG. 3B).

Figure 5:
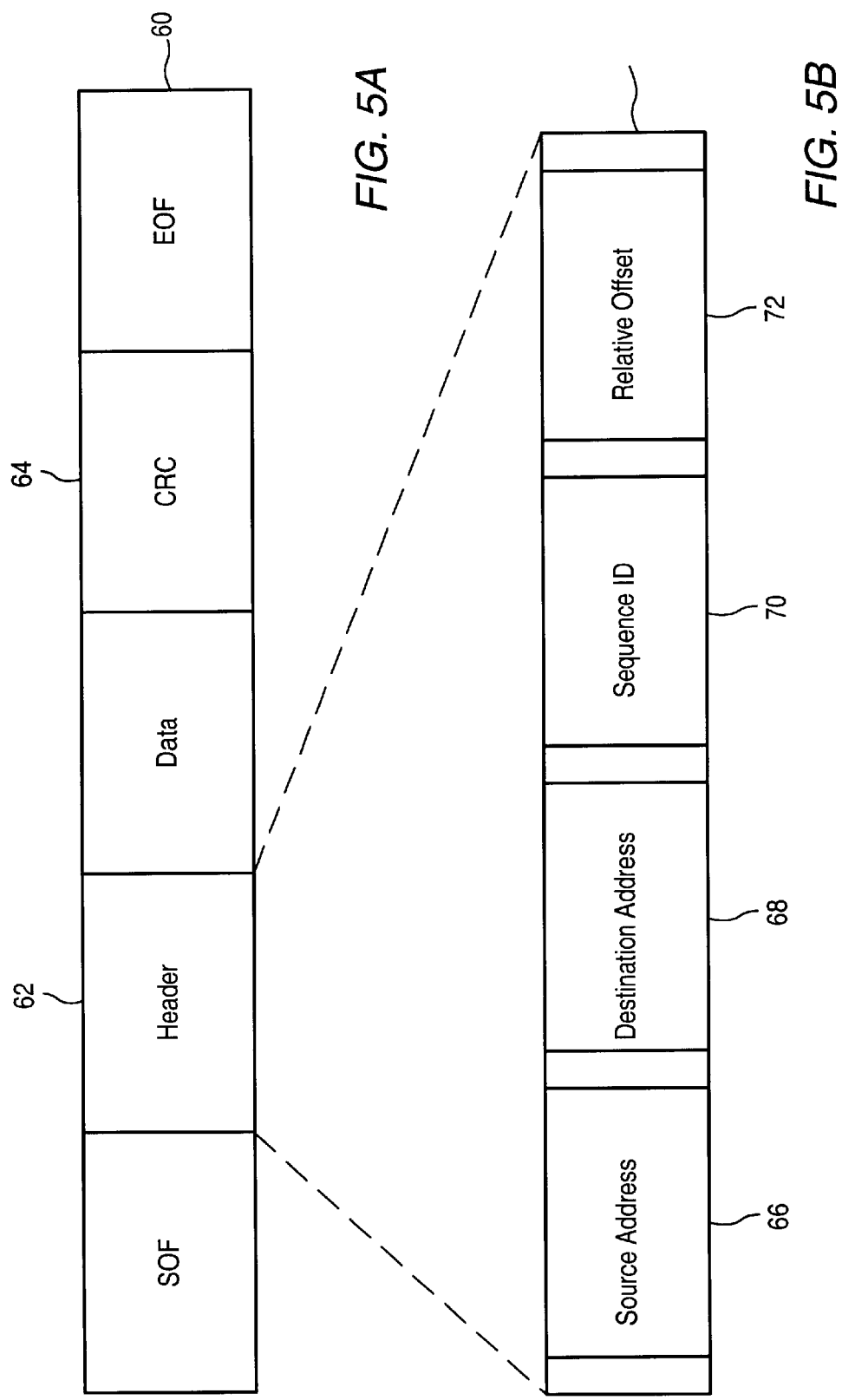
FIG. 5A is a diagram of an exemplary frame for conveying packets according to a data transfer standard (e.g., the Fibre Channel standard), wherein the frame includes a header field.
FIG. 5B is a diagram of an exemplary header field of the frame of FIG. 5A.

FIG. 5A is a diagram of an exemplary frame 60 for conveying packets according to a data transfer standard (e.g., the Fibre Channel standard). A packet is transmitted as one or more frames under the Fibre Channel standard. Frame 60 includes a start of frame (SOF) field, a header field 62, a data field, a cyclic redundancy check (CRC) field 64, and an end of frame (EOF) field. CRC field 64 includes a mathematical value used for error detection derived using the information contained within the SOF field, header field 62, and the data field.

FIG. 5B is a diagram of an exemplary header field 62 of frame 60 of FIG. 5A. Header field 62 includes a source address field 66, a destination address field 68, a sequence identification (ID) field 70, and a relative offset field 72. Source address field 66 contains the address of the device which generated frame 60 (i.e., the source device), wherein the address of the source device is a value which uniquely identifies the source device. Destination address field 68 contains the address of the device which is the intended receiver of frame 60 (i.e., the destination device), wherein the address of the destination device is a value which uniquely identifies the destination device. In the Fibre Channel standard, a "sequence" is composed of one or more frames containing "payload" specific to a particular protocol (e.g., the small computer system interface or SCSI protocol). Sequence ID field 70 identifies each sequence between an exchange originator and responder with a unique value. Relative offset field 72 contains a value indicating an offset associated with the data contained within the data field of frame 60 relative to a base address of a data buffer associated with the data transfer operation.

Transfer node 34 may route data between host computer 12 and storage device 18A and/or storage device 18B in any way such that storage controller 38 and link 40C are eliminated from the data path. For example, under the Fibre Channel standard, a data transfer command may result in one or more sequences conveying data between host computer 12 and storage device 18A and/or storage device 18B, wherein each sequence includes one or more frames 60 of FIGS. 5A–5B. The routing of data by transfer node 34 as described above may be implemented at the command level, the sequence level, or the frame level. When implemented at the command level, transfer node 34 may extract data from received frames, temporarily store the data, and forward the data when all of the data associated with the data transfer command has been received. When the routing of data by transfer node 34 is implemented at the sequence level, transfer node 34 may extract data from received frames, temporarily store the data, and forward the data when all of the data associated with a sequence of the data transfer command has been received.

Figure 6:
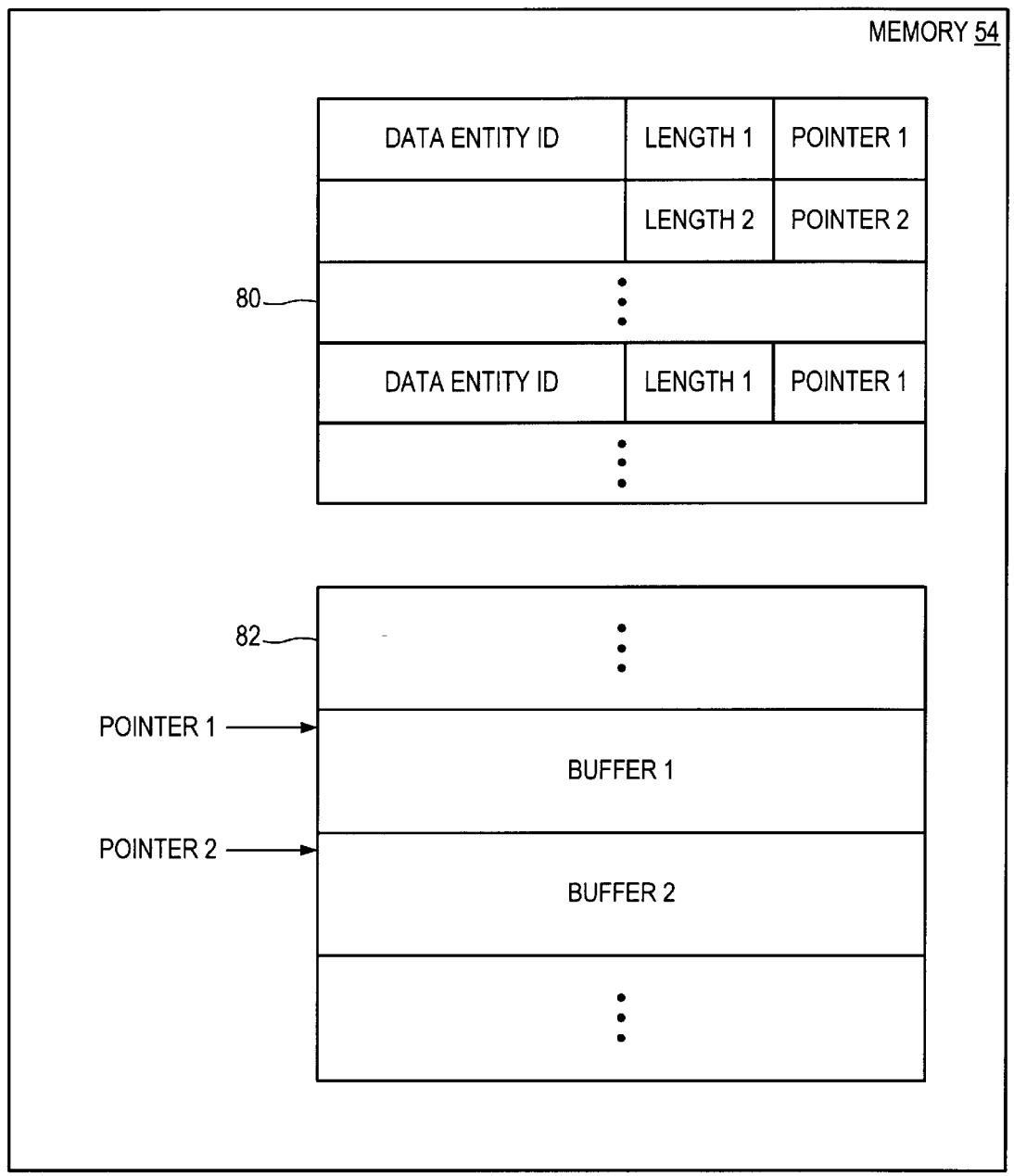
FIG. 6 is a block diagram of one embodiment of the memory of the transfer node of FIG. 4, wherein the memory includes a first lookup table and a buffer section.

FIG. 6 is a block diagram of one embodiment of memory 54 of transfer node 34 of FIG. 4. The embodiment of memory 54 of FIG. 6 may be used to implement the routing of data by transfer node 34 as described above at the command or sequence level. In the embodiment of FIG. 6, memory 54 includes a lookup table 80 and a buffer section 82. Lookup table 80 includes a number of entries. Each entry of lookup table 80 includes a data entity identification (ID) field, at least one length field, and at least one pointer field. The data entity identification field includes identification information which uniquely identifies a given data transfer entity. When the embodiment of memory 54 of FIG. 6 is used to implement data routing at the command level, the data entity is command data. When the embodiment of memory 54 of FIG. 6 is used to implement data routing at the sequence level, the data entity is sequence data. Each length field contains the length of a corresponding buffer within buffer section 82 assigned to one of the two storage devices 18 (e.g., storage device 18A). Each pointer field contains the base address of (i.e., a pointer to) the corresponding buffer.

For example, a first entry in lookup table 80 of FIG. 6 includes a length 1 field, a pointer 1 field, a length 2 field, and a pointer 2 field. The length 1 field contains the length of a first buffer (buffer 1) within buffer section 82 assigned to one of the two storage devices 18 (e.g., storage device 18A). The pointer 1 field contains the base address of (i.e., a pointer to) the first buffer. The length 2 field contains the length of a second buffer (buffer 2) within buffer section 82 assigned to the other storage device 18 (e.g., storage device 18B). The pointer 2 field contains the base address of (i.e., a pointer to) the second buffer.

When the embodiment of memory 54 of FIG. 6 is used to implement data routing at the command level, each entry of lookup table 80 corresponds to a different data transfer command, and the data entity identification information of each entry uniquely identifies the corresponding data transfer command. The data entity identification information includes command identification information. The command identification information may be, for example, a symbol or value assigned to the data transfer command by host computer 12 and conveyed to storage controller 38 as part of the data transfer command.

Alternately, storage controller 38 may generate the command identification information in response to the data transfer command, and may forward the command identification information to transfer node 34. For example, storage controller 38 may maintain a list of numbers, and may assign a number not currently in use to each data transfer command received from host computer 12. Storage controller 38 may forward the number to transfer node 34. When a number is assigned to a data transfer command, the number is considered in use until the data transfer command is completed.

When the embodiment of memory 54 of FIG. 6 is used to implement data routing at the sequence level, each entry of lookup table 80 corresponds to a different sequence of a data transfer command, and the data entity identification information of each entry uniquely identifies a corresponding sequence. The data entity identification information includes sequence identification information and/or the command identification information described above. The sequence identification information may be, for example, a symbol or value generated by transfer node 34.

When data routing by transfer node 34 is implemented at the command or sequence level and storage controller 38 receives a data transfer command from host computer 12, storage controller 38 generates the one or more translated data transfer commands and lookup table 80 entry information associated with the data transfer command. The lookup table 80 entry information includes data entity identification information and the values for the length and pointer fields of lookup table 80 entries associated with the data transfer. Storage controller 38 forwards the one or more translated data transfer commands and the lookup table 80 entry information to transfer node 34. CPU 52 of transfer node 34 may store the lookup table 80 entry information within memory 54.

When a receive unit of a channel port 50 of transfer node 34 receives data frames of the data transfer command, the receive unit extracts the data from the frames. CPU 52 may store the received data within one or more buffers within buffer section 82 of memory 54 according to the contents of lookup table 80. For example, buffer 1 in FIG. 6 may be assigned to storage device 18A, and buffer 2 may be assigned to storage device 18B. CPU 52 may use the contents of the pointer 1 and/or length 1 fields of a lookup table 80 entry to access buffer 1, and may use the contents of the pointer 2 and/or length 2 fields of the lookup table 80 entry to access buffer 2.

When the data of an entire data entity is stored within one or more buffers of memory 54, CPU 52 transfers the data from memory 54 to a transmit unit of the other channel port 50 via node bus 56. The transmit unit of the other channel port 50 packetizes the data and transmits the frames 60 of the one or more packets. As a result, data is transferred between host computer 12 and storage devices 18A–18B through transfer node 34 such that storage controller 38 and link 40C are eliminated from the data path.

Figure 7:
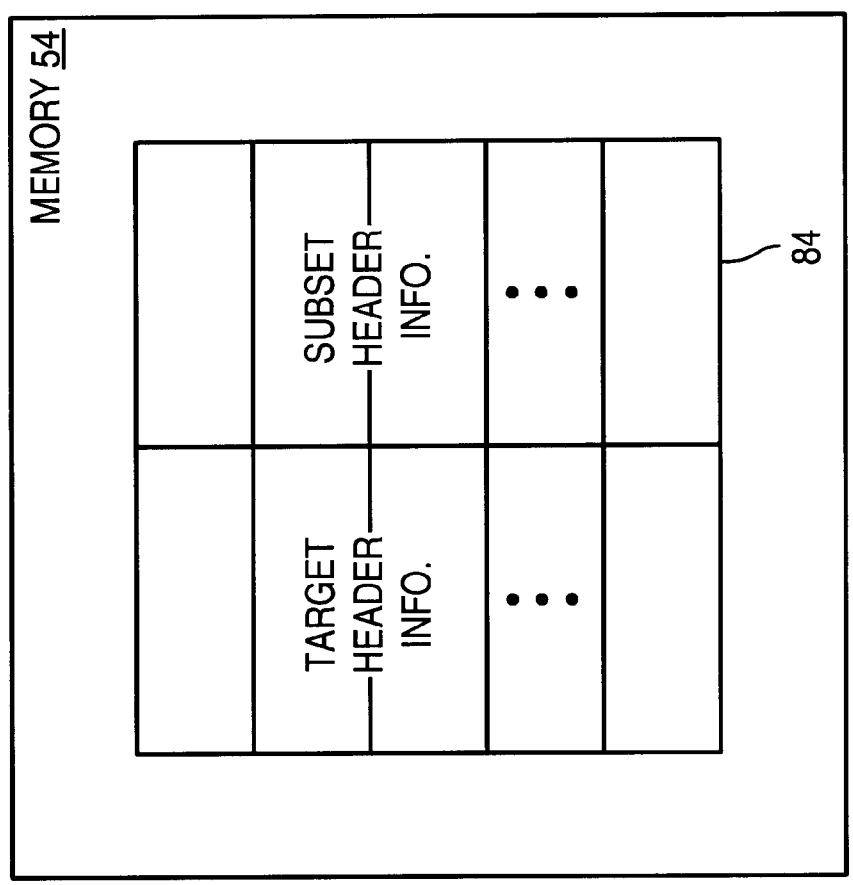
FIG. 7 is a block diagram of an alternate embodiment of the memory of the transfer node of FIG. 4, wherein the memory includes a second lookup table.

FIG. 7 is a block diagram of an alternate embodiment of memory 54 of transfer node 34 of FIG. 4. The embodiment of memory 54 of FIG. 7 may be used to implement the routing of data by transfer node 34 as described above at the frame level. As described above, a packet is transmitted as one or more frames under the Fibre Channel standard. In the embodiment of FIG. 7, memory 54 includes a lookup table 84. Lookup table 84 includes target header information and corresponding substitute header information.

When data routing by transfer node 34 is implemented at the frame level and storage controller 38 receives a data transfer command from host computer 12, storage controller 38 generates the one or more translated data transfer commands and frame header substitution information associated with the data transfer. The frame header substitution information includes target header information and corresponding substitute header information. The target header information includes at least a portion of header field 62 of a frame 60 conveying data and expected to be received by a receive unit of a channel port 50 of transfer node 34 during the data transfer. The substitute header information includes header information to be substituted by CPU 52, or special purpose hardware, for header information of a received frame if the header information matches the target header information. Storage controller 38 provides the one or more translated data transfer commands and the frame header substitution information to transfer node 34. CPU 52 of transfer node 34 may store the frame header substitution information within memory 54.

A frame 60 of data associated with a data transfer command and received by a receive unit of a channel port 50 of transfer node 34 may be temporarily stored within an input buffer of the receive unit. While the frame 60 is stored within the input buffer, CPU 52 may compare the contents of header field 62 of the frame 60 to target header information stored within lookup table 84. If the contents of header field 62 of the frame 60 matches target header information stored within lookup table 84, CPU 52 replaces the contents of header field 62 of the frame 60 with the substitute header information corresponding to the target header information within lookup table 84. CPU 52 may also recalculate the CRC value within CRC field 64 of the frame 60.

CPU 52 may transfer the modified frame 60 from the input buffer of the receive unit to an output buffer of a transmit unit of the other channel port 50 via node bus 56, and may direct the transmit unit to transmit the modified frame 60. As a result, data is transferred between host computer 12 and storage devices 18A–18B through transfer node 34 such that storage controller 38 and link 40C are eliminated from the data path.

Figure 8A:
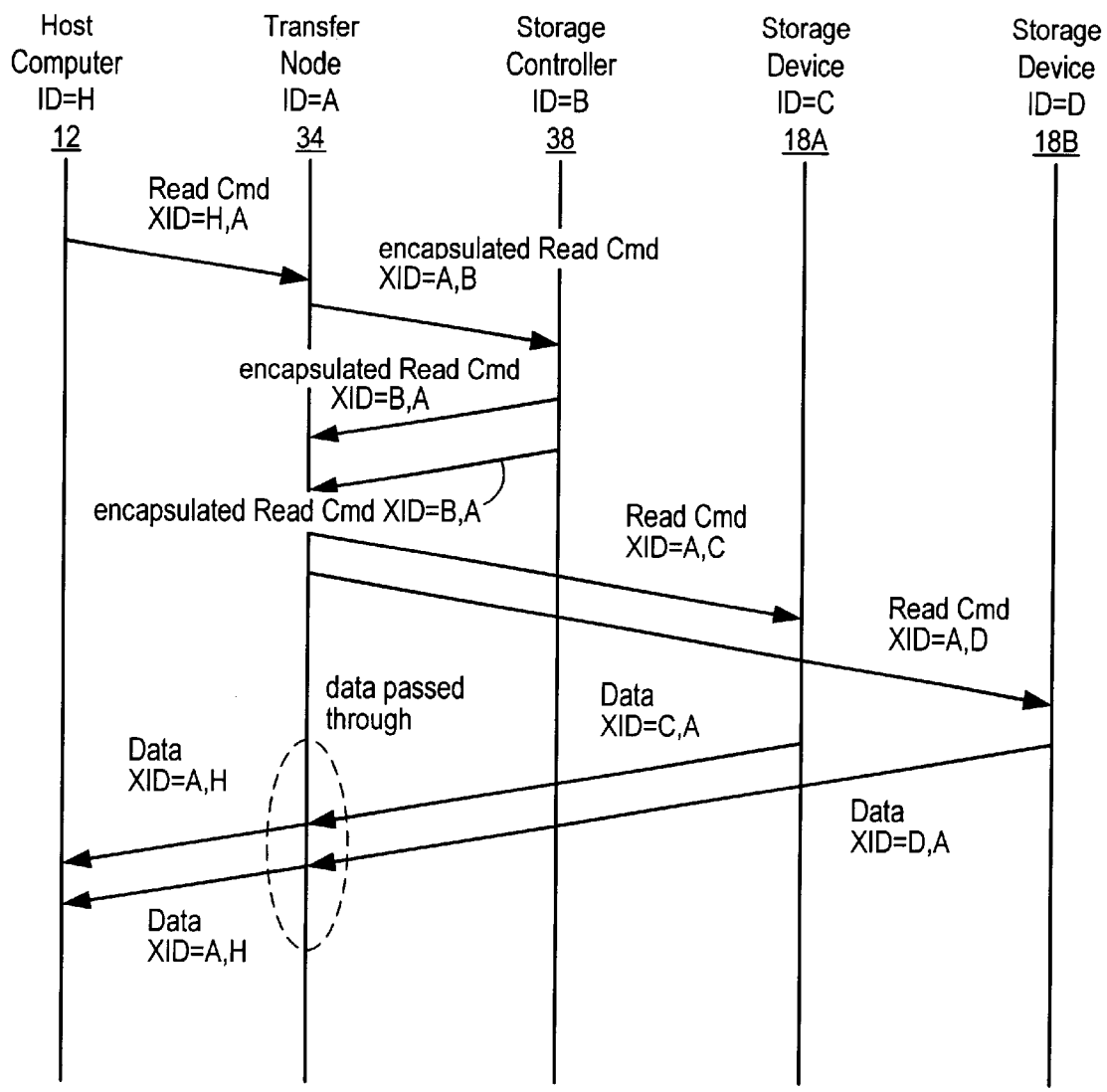
FIGS. 8A–B illustrate an exemplary flow of control and data packets during a data read operation initiated by the host computer of the computer system of FIG. 3A.
Figure 8B:
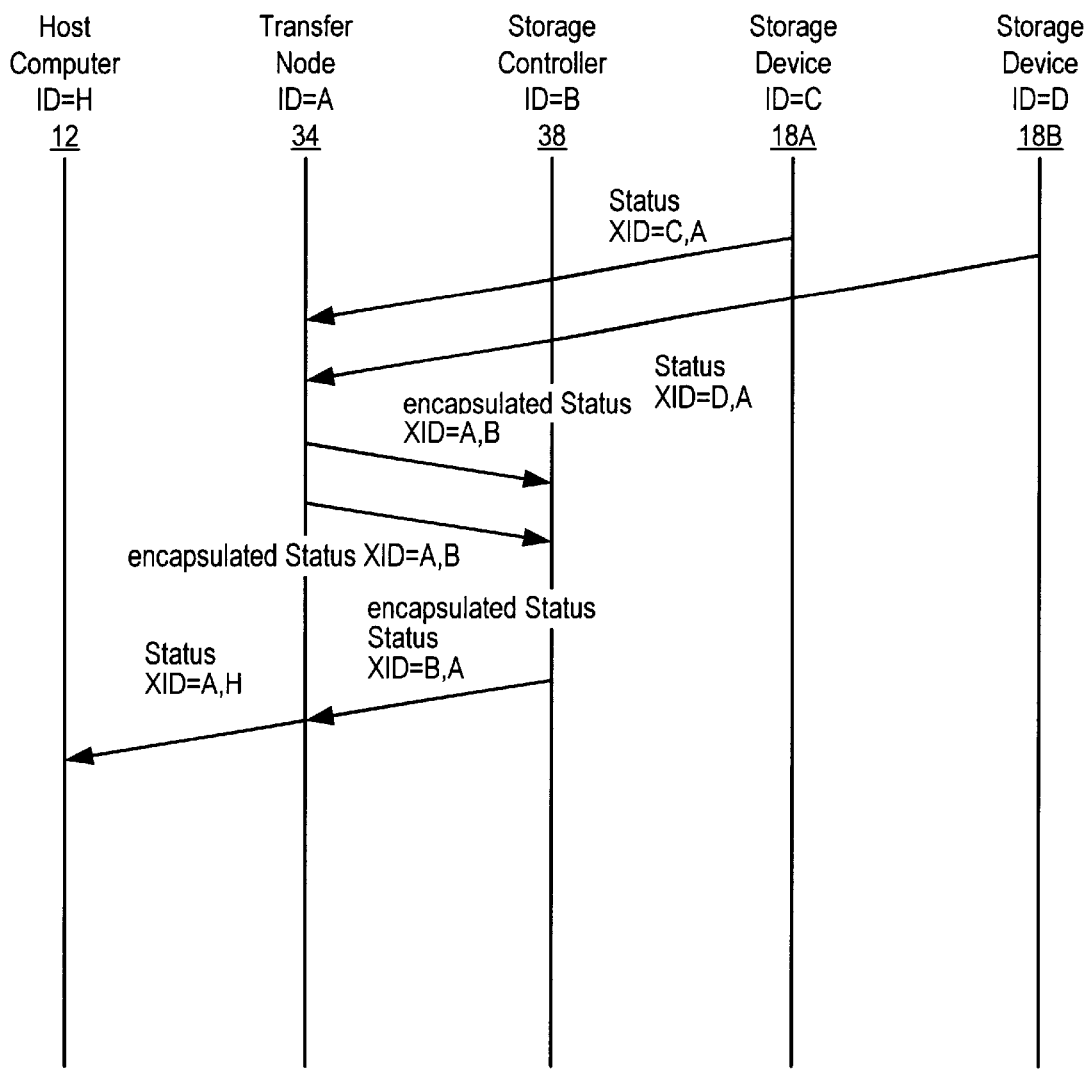

FIGS. 8A–B illustrate an exemplary flow of control and data packets during a data read operation initiated by host computer 12 of computer system 30 of FIG. 3A. Communications within computer system 30 are assumed to comply with the Fibre Channel standard, and single packet data transfers are assumed hereinbelow for simplicity. Referring first to FIG. 8A in conjunction with FIGS. 3, 4, 5A–B, and 6–7, host computer 12 transmits a read command packet identifying transfer node 34 as its destination (XID=H,A) upon link 40A in FIG. 3A.

A receive unit of channel port 50A of transfer node 34 receives the one or more frames of the read command packet. CPU 52 of transfer node 34 may use secondary address information within each frame, the contents of source address field 66 of header field 62 of each frame, and/or information within each frame identifying the frame as containing a data transfer command in order to determine that the frames of the read command packet should be routed to storage controller 38. CPU 52 encapsulates the received read command packet within an encapsulating packet, and forwards the encapsulating packet to a transmit unit of channel port 50B via node bus 56. The one or more frames of the encapsulating packet have header fields 62 including source address fields 66 containing the address of transfer node 34 (ID=A) and destination address fields 68 containing the address of storage controller 38 (ID=B). The transmit unit of channel port 50B transmits the encapsulated read command packet identifying storage controller 38 as its destination (XID=A,B) via link 40 in FIG. 3A. Switch 36 routes the encapsulated read command packet to storage controller 38.

Storage controller 38 receives the encapsulated read command packet and extracts the read command and source information from the encapsulated read command packet. Storage controller 38 translates the read command as described above, producing two separate translated read commands to obtain the data requested by host computer 12. A first translated read command obtains data from storage device 18A, and the second translated read command obtains data from storage device 18B. Each of the translated read commands instructs respective storage devices 18A–18B to access and provide data identified by the translated read command. Storage controller 38 also generates lookup table information as described above. The lookup table information may include lookup table 80 entry information (FIG. 6) or frame header substitution information for lookup table 84 (FIG. 7).

Storage controller 38 packetizes the first translated read command, forming a first translated read command packet. The one or more frames of the first translated read command packet have header fields 62 including source address fields 66 containing the address of transfer node 34 (ID=A) and destination address fields 68 containing the address of storage device 18A (ID=C).

Storage controller 38 packetizes the second translated read command, forming a second translated read command packet. The one or more frames of the second translated read command packet have header fields 62 including source address fields 66 containing the address of transfer node 34 (ID=A) and destination address fields 68 containing the address of storage device 18B (ID=D).

Storage controller 38 encapsulates the first and second translated read command packets within encapsulating packets, thereby forming encapsulated translated read command packets. The one or more frames of the encapsulating packets have header fields 62 including source address field 66 containing the address of storage controller 38 (ID=B) and destination address fields 68 containing the address of transfer node 34 (ID=A). Storage controller 38 transmits the encapsulating packets identifying transfer node 34 as their destinations (XID=B,A) via link 40C in FIG. 3A. Switch 36 routes the encapsulated translated read command packets to transfer node 34.

Storage controller 38 also conveys the lookup table information to transfer node 34. Storage controller 38 may, for example, include the lookup table information within the encapsulating packets used to encapsulate the first and second translated read commands. Alternately, storage controller 38 may packetize the lookup table information separately and convey the lookup table information to transfer node 34 within packets separate from the encapsulated translated read command packets.

A receive unit of channel port 50B of transfer node 34 receives the encapsulated translated read command packets and the lookup table information. CPU 52 stores the lookup table information within memory 54, extracts the first and second translated read command packets from the encapsulating packets, and forwards the first and second translated read command packets to the transmit unit of channel port 50B. The transmit unit of channel port 50B transmits the first translated read command packet identifying storage device 18A as its destination (XID=A,C) upon link 40B in FIG. 3A, and transmits the second translated read command packet identifying storage device 18B as its destination (XID=A,D) upon link 40B in FIG. 3A. Switch 36 receives the first and second translated read command packets via link 40B. Switch 36 routes the first translated read command packet to storage device 18A via link 40D, and routes the second translated read command packet to storage device 18B via link 40E.

Storage device 18A receives the first translated read command packet, accesses the requested data, and transmits a first data packet including the requested data to transfer node 34 (XID=C,A). Similarly, storage device 18B receives the second translated read command packet, accesses the requested data, and transmits a second data packet including the requested data to transfer node 34 (XID=D,A). Storage devices 18A–18B also generate status packets relaying the status of the read operations. The flow of data packets will be described first, followed by a description of the flow of status packets. Switch 36 routes the first and second data packets to transfer node 34.

The receive unit of channel port 50B of transfer node 34 receives the first and second data packets via link 40B. CPU 52 uses the lookup table information stored within memory 54 to route the data between the receive unit of channel port 50B and the transmit unit of channel port 50A using any one of the methods described above. The transmit unit of channel port 50A transmits the data from storage device 18A as a first data packet identifying host computer 12 as its destination (XID=A,H), and transmits the data from storage device 18B as a second data packet identifying host computer 12 as its destination (XID=A,H). As noted above, data is transferred from storage devices 18A–18B to host computer 12 such that storage controller 38, and link 40C, are excluded from the data path.

Referring now to FIG. 8B in conjunction with FIGS. 3, 4, 5A–B, and 6–7, the flow of status packets will now be described. Storage device 18A transmits a first status packet to transfer node 34 (XID=C,A). Similarly, storage device 18B transmits a second status packet to transfer node 34 (XID=D,A). Switch 36 routes the first and second status packets to transfer node 34.

The receive unit of channel port 50B of transfer node 34 receives the first and second status packets. CPU 52 encapsulates the first and second status packets within encapsulating packets, thereby forming encapsulated status packets. The one or more frames of the encapsulating packets have header fields 62 including source address field 66 containing the address of transfer node 34 (ID=A) and destination address fields 68 containing the address of storage controller 38 (ID=B). CPU 52 forwards the encapsulating packets to the transmit unit of channel port 50B of transfer node 34. The transmit unit of channel port 50B transmits the encapsulating packets identifying storage controller 38 as their destinations (XID=A,B) via link 40B in FIG. 3A. Switch 36 routes the encapsulated status packets to storage controller 38.

Storage controller 38 receives the encapsulated status packets and extracts the status and source information from the encapsulated status packets. Storage controller 38 combines the status information from storage devices 18A–18B to form a composite status. Storage controller packetizes the composite status, forming a composite status packet. The one or more frames of the composite status packet have header fields 62 including source address fields 66 containing the address of transfer node 34 (ID=A) and destination address fields 68 containing the address of host computer 12 (ID=H).

Storage controller 38 encapsulates the composite status packet within an encapsulating packet, thereby forming an encapsulated composite status packet. The one or more frames of the encapsulating packet have header fields 62 including source address fields 66 containing the address of storage controller 38 (ID=B) and destination address fields 68 containing the address of transfer node 34 (ID=A). Storage controller 38 transmits the encapsulating packet identifying transfer node 34 as its destination (XID=B,A) via link 40C in FIG. 3A. Switch 36 routes the encapsulated translated read command packets to transfer node 34.

The receive unit of channel port 50B of transfer node 34 receives the encapsulated composite status packet. CPU 52 extracts the composite status packet from the encapsulating packet, and forwards the composite status packet to the transmit unit of channel port 50A. The transmit unit of channel port 50A transmits the composite status packet identifying host computer 12 as its destination (XID=A,H) upon link 40A in FIG. 3A. Host computer 12 receives the composite status packet via link 40A.

Figure 9:
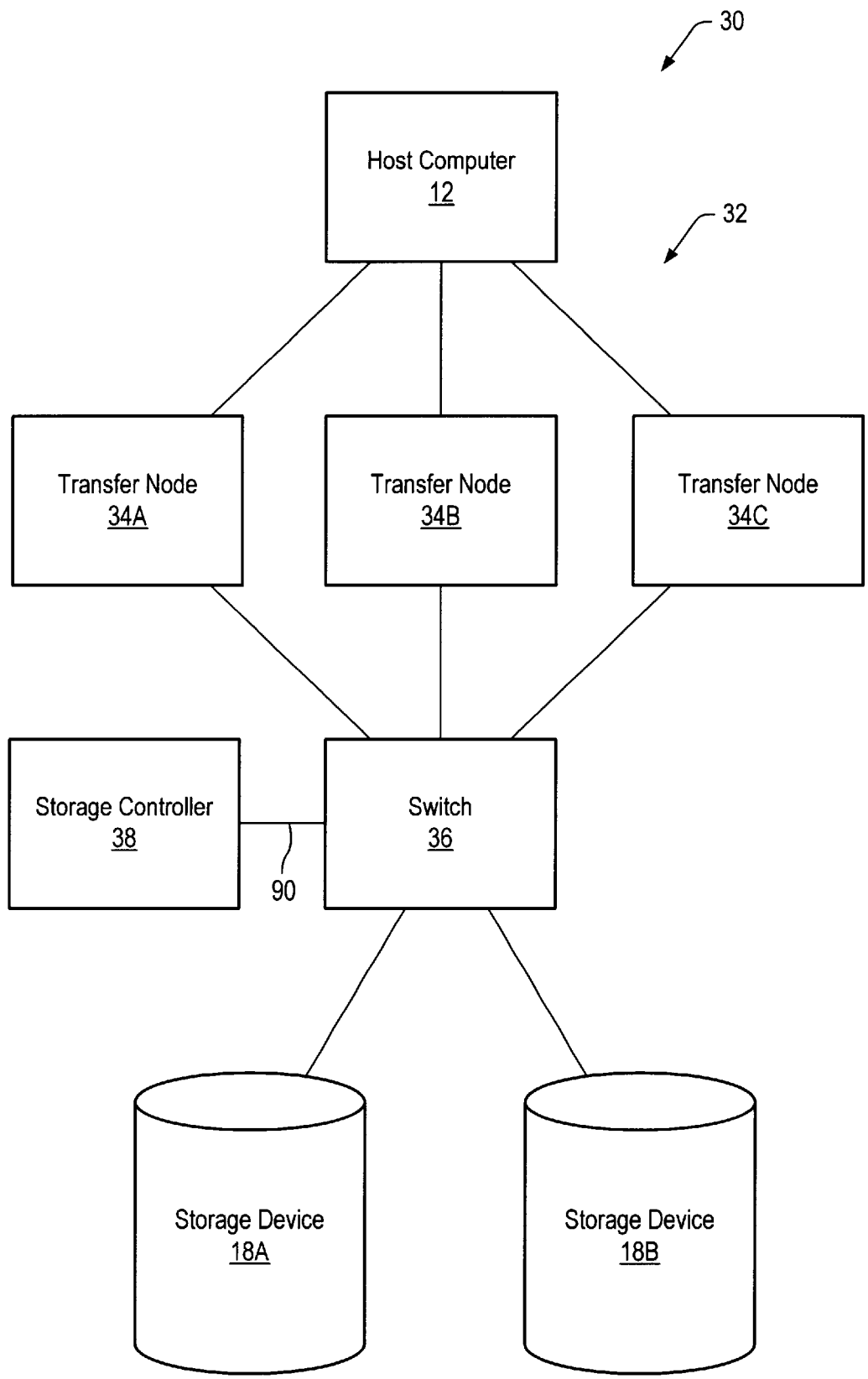
FIG. 9 is a diagram of a third embodiment of the computer system of FIG. 3A wherein the storage system includes multiple transfer nodes coupled in parallel between the host computer and the switch.

FIG. 9 is a diagram of a third embodiment of computer system 30 wherein storage system 32 includes multiple transfer nodes 34A–34C coupled in parallel between host computer 12 and switch 36. Storage controller 38 is coupled to switch 36 via an interconnect link 90. The increased number of transfer nodes in FIG. 9 provides increased data bandwidth between host computer 12 and storage devices 18A–18B over the embodiment of storage system 32 of FIG. 3A.

Figure 10:
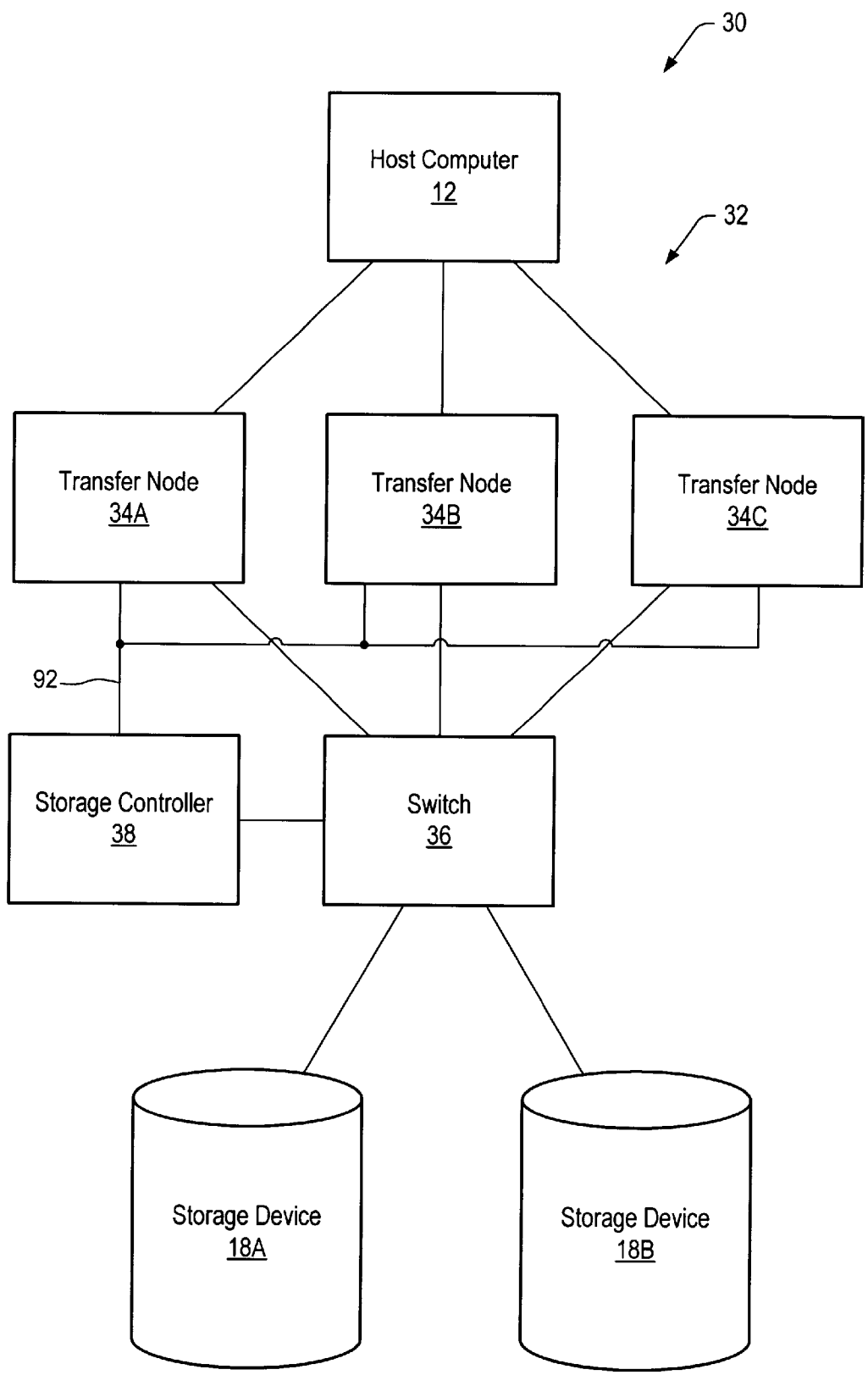
FIG. 10 is a diagram of a fourth embodiment of the computer system of FIG. 3A wherein the storage system includes multiple transfer nodes coupled in parallel between the host computer and the switch, and wherein the storage controller is coupled directly to each of the multiple transfer nodes.

FIG. 10 is a diagram of a fourth embodiment of computer system 30 wherein storage system 32 includes multiple transfer nodes 34A–34C coupled in parallel between host computer 12 and switch 36, and wherein storage controller 38 is coupled directly to each of the multiple transfer nodes 34A–34C via a transmission medium configured as a loop 92 (e.g., a Fibre Channel arbitrated loop). The direct connection between storage controller 38 and each of the multiple transfer nodes 34A–34C via loop 92 in FIG. 10 eliminates an interconnect link 90 bottleneck in FIG. 9. As a result, the embodiment of storage system 32 of FIG. 10 provides increased data bandwidth between host computer 12 and storage devices 18A–18B over the embodiment of storage system 32 of FIG. 9.

Numerous variations and modifications will become apparent to those skilled in the art once the above disclosure is fully appreciated. It is intended that the following claims be interpreted to embrace all such variations and modifications.

What is claimed is:

1. A transfer node, comprising:
   a first channel port adapted for coupling to a host computer;
   a second channel port adapted for coupling to a storage controller and at least one storage device;
   a central processing unit (CPU) coupled to the first and second channel ports;
   a memory coupled to the CPU;
   wherein the transfer node is configured to:
      receive a data transfer command from the host computer via the first channel port;
      receive data routing information associated with the data transfer command from the storage controller via the second channel port;
      store the data routing information within the memory; and
      route data associated with the data transfer command between the first and second channel ports using the data routing information stored within the memory; and
      forward the data to the host computer via the first channel port.

2. The transfer node as recited in claim 1, wherein the data transfer command directs a transfer of data between the host computer and the at least one storage device.

3. The transfer node as recited in claim 1, wherein the memory comprises a lookup table and a data buffer area, and wherein the data routing information comprises command identification information uniquely identifying the data transfer command and a pointer to a data buffer within the data buffer area, and wherein the command identification information and the pointer are stored within the lookup table.

4. The transfer node as recited in claim 3, wherein the transfer node is configured to store at least a portion of the data associated with the data transfer command within the data buffer using the pointer, and to route the data from the data buffer to either the first channel port or the second channel port when all of the data associated with the data transfer command has been received by the transfer node.

5. The transfer node as recited in claim 1, wherein the memory comprises a lookup table, and wherein the data routing information comprises target header information and corresponding substitute header information, and wherein the target header information includes at least a portion of a header field of an expected data frame, and wherein the substitute header information includes header information to be substituted for the header information of the expected data frame, and wherein the target header information and corresponding substitute header information are stored within the lookup table.

6. The transfer node as recited in claim 5, wherein the transfer node is configured to: (i) compare header information of a data frame received at either the first channel port or the second channel port to the target header information within the lookup table, (ii) replace the header information of the data frame with the substitute header information corresponding to the target header information if the header information of the data frame matches the target header information, and (iii) route the data frame to the other channel port.

7. The transfer node as recited in claim 1, wherein the transfer node is further configured to forward the data transfer command to the storage controller via the second channel port.

8. The transfer node as recited in claim 1, wherein the transfer node is further configured to:
receive a translated data transfer command from the storage controller via the second channel port; and
forward the translated data transfer command to the at least one storage device via the second channel port.

9. A transfer node, comprising:
a first channel port adapted for coupling to a host computer;
a second channel port adapted for coupling to a storage controller and at least one storage device;
a central processing unit (CPU) coupled to the first and second channel ports;
a memory coupled to the CPU;
wherein the transfer node is configured to:
receive a data transfer command from the host computer via the first channel port;
forward the data transfer command to the storage controller via the second channel port;
receive a translated data transfer command and data routing information from the storage controller via the second channel port;
store the data routing information within the memory;
forward the translated data transfer command to the at least one storage device via the second channel port;
wherein when the data transfer command is a read command, the transfer node is configured to:
receive data associated with the data transfer command from the at least one storage device via the second channel port;
route the data from the second channel port to the first channel port using the data routing information stored within the memory; and
forward the data to the host computer via the first channel port.

10. A storage system, comprising:
a switch coupled to at least one storage device;
a transfer node coupled between a host computer and the switch, wherein the transfer node comprises a memory for storing data routing information;
a storage controller coupled to the transfer node;
wherein the transfer node is configured to receive a data transfer command from the host computer and to forward the data transfer command to the storage controller;
wherein the storage controller is configured to receive the data transfer command, to generate a translated data transfer command and data routing information in response to the data transfer command, and to forward the translated data transfer command and the data routing information to the transfer node; and
wherein the transfer node is configured to forward the translated data transfer command to the at least one storage device, to store the data routing information within the memory, and to use the data routing information to route data associated with the data transfer command between the host computer and the at least one storage device such that the data does not pass through the storage controller.

11. The storage system as recited in claim 10, wherein the data transfer command directs a transfer of data between the host computer and the at least one storage device.

12. The storage system as recit6ed in claim 10, wherein the storage controller is coupled to the switch and to the transfer node via the switch.

13. The storage system as recited in claim 10, wherein the transfer node further comprises a first channel port coupled to the host computer and a second channel port coupled to the storage controller and the at least one storage device.

14. The storage system as recited in claim 13, wherein the memory comprises a lookup table and a data buffer area, and wherein the data routing information comprises command identification information uniquely identifying the data transfer command and a pointer to a data buffer within the data buffer area, and wherein the command identification information and the pointer are stored within the lookup table.

15. The storage system as recited in claim 14, wherein the transfer node is configured to store at least a portion of the data associated with the data transfer command within the data buffer using the pointer, and to route the data from the data buffer to either the first channel port or the second channel port when all of the data associated with the data transfer command has been received by the transfer node.

16. The storage system as recited in claim 13, wherein the memory comprises a lookup table, and wherein the data routing information comprises target header information and corresponding substitute header information, and wherein the target header information includes at least a portion of a header field of an expected data frame, and wherein the substitute header information includes header information to be substituted for the header information of the expected data frame, and wherein the target header information and corresponding substitute header information are stored within the lookup table.

17. The storage system as recited in claim 16, wherein the transfer node is configured to: (i) compare header information of a data frame received at either the first channel port or the second channel port to the target header information within the lookup table, (ii) replace the header information of the data frame with the substitute header information corresponding to the target header information if the header information of the data frame matches the target header information, and (iii) route the data frame to the other channel port.

18. A computer system, comprising:

at least one storage device;

a host computer configured to produce a data transfer command, wherein the data transfer command directs a transfer of data between the host computer and the at least one storage device;

a transfer node coupled between the host computer and the at least one storage device, wherein the transfer node comprises a memory for storing data routing information;

a storage controller coupled to the transfer node;

wherein the transfer node is configured to receive the data transfer command from the host computer and to forward the data transfer command to the storage controller;

wherein the storage controller is configured to receive the data transfer command, to generate a translated data transfer command and data routing information in response to the data transfer command, and to forward the translated data transfer command and the data routing information to the transfer node; and wherein the transfer node is configured to forward the translated data transfer command to the at least one storage device, to store the data routing information within the memory, and to use the data routing information to route data associated with the data transfer command directly between the host computer and the at least one storage device such that the data does not pass through the storage controller.

19. The computer system as recited in claim 18, further comprising a switch coupled between the transfer node and the at least one storage device such that the transfer node is coupled to the at least one storage device through the switch.

20. The computer system as recited in claim 19, wherein the a storage controller is coupled to the switch such that the storage controller is coupled to the transfer node through the switch.

21. The computer system as recited in claim 19, wherein the computer system comprises a plurality of transfer nodes coupled between the host computer and the switch, and wherein each transfer node comprises a memory for storing data routing information.

22. The computer system as recited in claim 19, wherein the a storage controller is coupled directly to each of the transfer nodes.

23. A method for routing data within a storage system, comprising:

coupling a transfer node between a host computer and a switch, wherein the switch is coupled to at least one storage device, and wherein the transfer node comprises a memory for storing data routing information;

coupling a storage controller to the transfer node;

forwarding data routing information associated with a data transfer command from the storage controller to the transfer node;

storing the data routing information within the memory of the transfer node; and using the data routing information to route data associated with the data transfer command between the host computer and the at least one storage device such that the data does not pass through the storage controller.

24. In a storage system comprising a storage controller and a transfer node, a method for conveying data within the storage system, comprising:

the transfer node receiving a data transfer command from a host computer coupled to the transfer node;

the transfer node conveying the data transfer command to the storage controller;

the storage controller generating data routing information dependent upon the data transfer command, and conveying the data routing information to the transfer node; and the transfer node receiving data for the data transfer command from one or more storage devices and forwarding the data to the host computer so that the data is conveyed from the one or more storage devices to the host computer without being conveyed through the storage controller.

25. In a storage system comprising a storage controller and a transfer node, a method for conveying data within the storage system, comprising:

the transfer node receiving a data transfer command from a host computer coupled to the transfer node;

the transfer node conveying the data transfer command to the storage controller;

the storage controller translating the data transfer command into one or more device data transfer commands, and conveying the device data transfer commands to the transfer node on a controller bus;

the transfer node forwarding the device data transfer commands to one or more storage devices; and the transfer node receiving data in response to the device data transfer commands and forwarding the data to the host computer so that the data is conveyed from the one or more storage devices to the host computer without being conveyed through the storage controller.

* * * * *

UNITED STATES PATENT AND TRADEMARK OFFICE
CERTIFICATE OF CORRECTION

PATENT NO. : 6,604,155 B1
DATED : August 5, 2003
INVENTOR(S) : Fay Chong Jr.

It is certified that error appears in the above-identified patent and that said Letters Patent is hereby corrected as shown below:

<u>Column 16,</u>
Line 31, please delete "recit6ed" insert -- recited -- in place thereof.

Signed and Sealed this

Seventh Day of October, 2003

JAMES E. ROGAN
*Director of the United States Patent and Trademark Office*